(12) United States Patent
Sasikumar et al.

(10) Patent No.: US 11,943,092 B2
(45) Date of Patent: Mar. 26, 2024

(54) SYSTEM AND METHOD FOR AUTO-MINING OF RESOURCES, BUILDING DEPENDENCY REGISTRY AND NOTIFYING IMPACTED SERVICES

(71) Applicant: JPMorgan Chase Bank, N.A., New York, NY (US)

(72) Inventors: Krishnan Sasikumar, Bengaluru (IN); Rajesh Nadar, Glasgow (GB); Bret Goldsmith, Sugar Land, TX (US); Vaishakhi Ajmera, Mumbai (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 17/644,429

(22) Filed: Dec. 15, 2021

(65) Prior Publication Data

US 2023/0118856 A1    Apr. 20, 2023

(30) Foreign Application Priority Data

Oct. 18, 2021    (IN) .............................. 202111047062

(51) Int. Cl.
    *H04L 41/0631*    (2022.01)
    *H04L 41/0686*    (2022.01)
    *H04L 67/10*    (2022.01)

(52) U.S. Cl.
    CPC ........ *H04L 41/065* (2013.01); *H04L 41/0686* (2013.01); *H04L 67/10* (2013.01)

(58) Field of Classification Search
    CPC .... H04L 41/065; H04L 41/0686; H04L 67/10
    USPC ....................................................... 709/224
    See application file for complete search history.

(56) References Cited

U.S. PATENT DOCUMENTS

| 9,838,407 | B1 | 12/2017 | Oprea et al. |
| 10,666,715 | B2 * | 5/2020 | Chen .................. H04L 41/0816 |
| 2009/0171703 | A1 * | 7/2009 | Bobak ..................... G06Q 10/06 |
| | | | 705/7.15 |

(Continued)

OTHER PUBLICATIONS

International Search Report dated Mar. 1, 2022 issued in PCT/US2021/063537.

(Continued)

*Primary Examiner* — Cheikh T Ndiaye
*Assistant Examiner* — Ayele F Woldemariam
(74) *Attorney, Agent, or Firm* — GREENBLUM & BERNSTEIN, P.L.C.

(57) ABSTRACT

A method for providing dependency registration and impacted service notification is provided. The method includes mining resource data for a plurality of resources included in heterogeneous platforms included in a single eco-system, and identifying, for each resource, one or more connections with other resources present in the heterogeneous platforms based on the mined resource data. The method also includes generating a resource dependency chain from the resource data and the identified one or more connections, and monitoring change events for the resources included in the heterogeneous planforms. When a change event is detected for a target resource among the resources, the method includes determining one or more resources that are impacted by the change event detected for the target resource based on the resource dependency chain, and transmitting a notification to users of the impacted resources.

20 Claims, 8 Drawing Sheets

(56) References Cited

U.S. PATENT DOCUMENTS

2017/0085447 A1* 3/2017 Chen ..................... H04L 43/024
2017/0155672 A1* 6/2017 Muthukrishnan ....... H04L 67/02
2017/0373946 A1* 12/2017 Lewandowski ......... H04L 67/10
2018/0219897 A1 8/2018 Muddu et al.
2020/0104401 A1* 4/2020 Burnett ................. G06F 16/287
2021/0029143 A1 1/2021 Murphy et al.
2021/0144517 A1 5/2021 Guim Bernat et al.
2022/0329616 A1* 10/2022 O'Hearn ................ G06F 21/57

OTHER PUBLICATIONS

Written opinion of the international searching authority dated Mar. 1, 2022 issued in PCT/US2021/063537.

* cited by examiner

SYSTEM AND METHOD FOR AUTO-MINING OF RESOURCES, BUILDING DEPENDENCY REGISTRY AND NOTIFYING IMPACTED SERVICES

CROSS-REFERENCE TO RELATED APPLICATION(S)

This application claims priority benefit from Indian Application No. 202111047062, filed Oct. 18, 2021, which is hereby incorporated by reference in its entirety.

TECHNICAL FIELD

This disclosure generally relates to a system and method of building of a dependency chain across multiple heterogeneous platforms or environments present in an eco-system of an organization, and alerting of users that may be impacted by a failure of a resource included in the dependency chain.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Applications developed in an organization may be hosted across multiple heterogeneous platforms, such as Legacy Infrastructure/Virtual Machines, Private Cloud Foundry, Public Cloud (AWS or the like). However, such hosting practices result in consuming applications or services unable to have visibility of failures in related services or resources, which may be impacted. Conventionally, when a service fails, other hosting services are unaware of any error or impact unless a technician or a team of technicians investigates to identify the associated issue(s) and impact(s) of such failure leading to disrupted services and wasted resources. Similarly, when an upgrade or maintenance is performed on one of the platforms, users of other platforms may be unaware of such upgrades or maintenance, leading to various inefficiencies and false alarms.

SUMMARY

The present disclosure, through one or more of its various aspects, embodiments, and/or specific features or sub-components, provides, among other features, various systems, servers, devices, methods, media, programs, and platforms for implementing a cloud native dependency registration and impacted service notification (DRISN) system for building of a dependency chain across multiple heterogeneous platforms or environments present in an eco-system of an organization, and alerting of parties that may be effected by a failure of a resource included in the dependency chain, but the disclosure is not limited thereto.

According to an aspect of the present disclosure, a method for providing dependency registration and impacted service notification (DRISN) is disclosed. The method may include: mining, via a cloud network and by a processor, resource data for a plurality of resources included in each platform among a plurality of heterogeneous platforms included in a single eco-system; identifying, for each resource among the plurality of resources mined and by the processor, one or more connections with other resources present in the plurality of heterogeneous platforms based on the mined resource data; generating, by the processor, a resource dependency chain from the resource data and the identified one or more connections; storing, in a memory, the resource dependency chain; monitoring change events for the plurality of resources included in the plurality of heterogeneous planforms; and when a change event is detected for a target resource among the plurality of resources, retrieving the resource dependency chain from the memory, determining one or more resources that are impacted by the change event detected for the target resource based on the resource dependency chain, and transmitting, by a communication circuit, a notification to users of the one or more resources impacted by the change event detected for the target resource.

According to another aspect of the present disclosure, the change event includes performance below a predetermined threshold.

According to another aspect of the present disclosure, the change event includes an inability to connect to the target resource.

According to yet another aspect of the present disclosure, the change event indicates at least one of a nature of anomaly, a severity of the anomaly, a nature of impact and a severity of the impact.

According to another aspect of the present disclosure, the users include at least application users of the one or more resources impacted by the change event, support personnel of the one or more resources, support personnel of one or more platforms including the one or more resources, and one or more users requesting notification for the one or more resources impacted by the change event.

According to a further aspect of the present disclosure, the notification is provided by at least one of email, voice mail, text message, and a requested form of communication.

According to yet another aspect of the present disclosure, the notification indicates at least one of an identification of the target resource, a nature of the change event detected at the target resource, an identification of the one or more resources impacted by the change event, a degree of impact to the one or more resources impacted by the change event, an immediacy of resolution.

According to a further aspect of the present disclosure, the method further includes determining a number of connections for the target resource; and determining a degree of severity of impact based on the determined number of connections.

According to another aspect of the present disclosure, the method further includes determining whether the one or more resources impacted by the change event reside on a same or different platform from the target resource; and determining a degree of severity of impact to be higher when the one or more resources impacted by the change event reside on the different platform from the target resource.

According to a further aspect of the present disclosure, the resource data includes at least one of an identification of a corresponding resource, a platform identification, and a number of connections with other resources.

According to a further aspect of the present disclosure, the one or more resources that are impacted by the change event reside on a platform different from a platform on which the target resource resides.

According to a further aspect of the present disclosure, the resource dependency chain includes only resources having connections with the one or more connections with other resources present in the plurality of heterogeneous platforms.

According to a further aspect of the present disclosure, the resource dependency chain includes every resource present in the plurality of heterogeneous platforms.

According to a further aspect of the present disclosure, the resource dependency chain is generated for each of the plurality of heterogeneous platforms for a plurality of resource dependency chains.

According to another aspect of the present disclosure, the resource dependency chain is generated as a single aggregate resource dependency chain for the plurality of heterogeneous platforms.

According to another aspect of the present disclosure, the one or more connections with other resources present in the plurality of heterogeneous platforms is determined based on load balancing set for a respective resource.

According to another aspect of the present disclosure, further includes determining whether the one or more resources that are impacted by the change event reside are upstream resources that provide information to the target resource or downstream resources that receive information from the target resource; and transmitting the notification to users of only the downstream resources from the target resource.

According to another aspect of the present disclosure, further includes setting a priority for addressing each of the one or more resources that are impacted by the change event based on a number of connections with other resources set for each of the one or more resources that are impacted by the change event.

According to another aspect of the present disclosure, a dependency registration and impacted service notification (DRISN) system is disclosed. The system may include a processor; a memory; and a communication circuit. The processor is configured to: mine, via a cloud network, resource data for a plurality of resources included in each platform among a plurality of heterogeneous platforms included in one eco-system; identify, for each resource among the plurality of resources mined, one or more connections with other resources present in the plurality of heterogeneous platforms based on the mined resource data; generate a resource dependency chain from the resource data and the identified one or more connections; store, in the memory, the resource dependency chain; monitor, via a monitoring tool, change events for the plurality of resources included in the plurality of heterogeneous planforms; and when a change event is detected for a target resource among the plurality of resources, retrieve the resource dependency chain from the memory, determine one or more resources that are impacted by the change event detected for the target resource based on the resource dependency chain, and transmit, via the communication circuit, a notification to users of the one or more resources impacted by the change event detected for the target resource.

According to another aspect of the present disclosure, a non-transitory computer readable storage medium that stores a computer program for performing a projected graph based prediction is provided. The computer program, when executed by a processor, causing a system to perform a process, which includes: mining, via a cloud network, resource data for a plurality of resources included in each platform among a plurality of heterogeneous platforms included in one eco-system; identifying, for each resource among the plurality of resources mined, one or more connections with other resources present in the plurality of heterogeneous platforms based on the mined resource data; generating a resource dependency chain from the resource data and the identified one or more connections; storing, in a memory, the resource dependency chain; monitoring, via a monitoring tool, change events for the plurality of resources included in the plurality of heterogeneous planforms; and when a change event is detected for a target resource among the plurality of resources, retrieving the resource dependency chain from the memory, determining one or more resources that are impacted by the change event detected for the target resource based on the resource dependency chain, and transmitting, by a communication circuit, a notification to users of the one or more resources impacted by the change event detected for the target resource.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
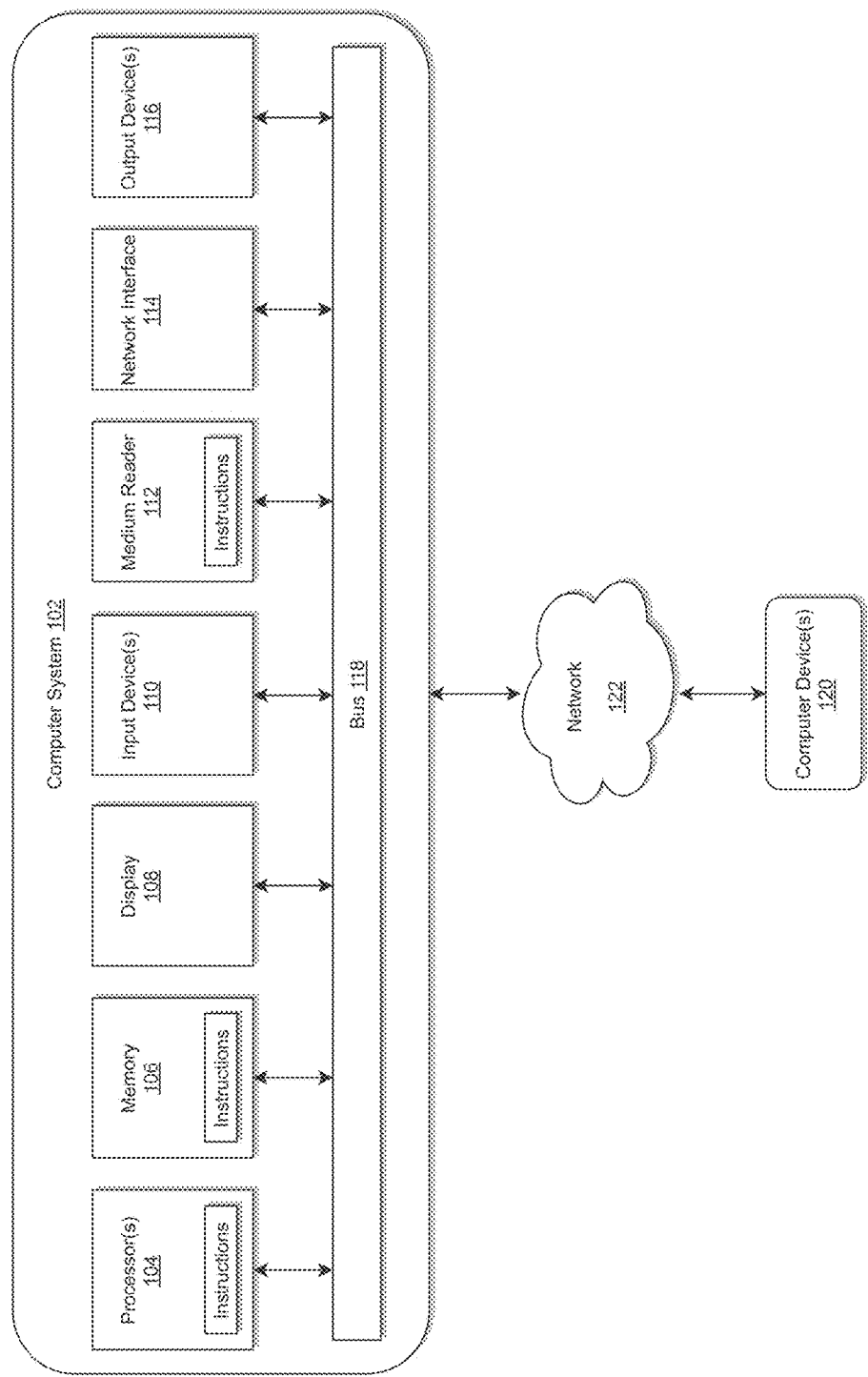
FIG. 1 illustrates a computer system for implementing a cloud native dependency registration and impacted service notification (DRISN) system for building of a dependency chain across multiple heterogeneous platforms or environments present in an eco-system of an organization, and alerting of parties that may be effected by a failure of a resource included in the dependency chain in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a cloud native dependency registration and impacted service notification (DRISN) system for building of a dependency chain across multiple heterogeneous platforms or environments present in an eco-system of an organization, and alerting of parties that may be effected by a failure of a resource included in the dependency chain in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
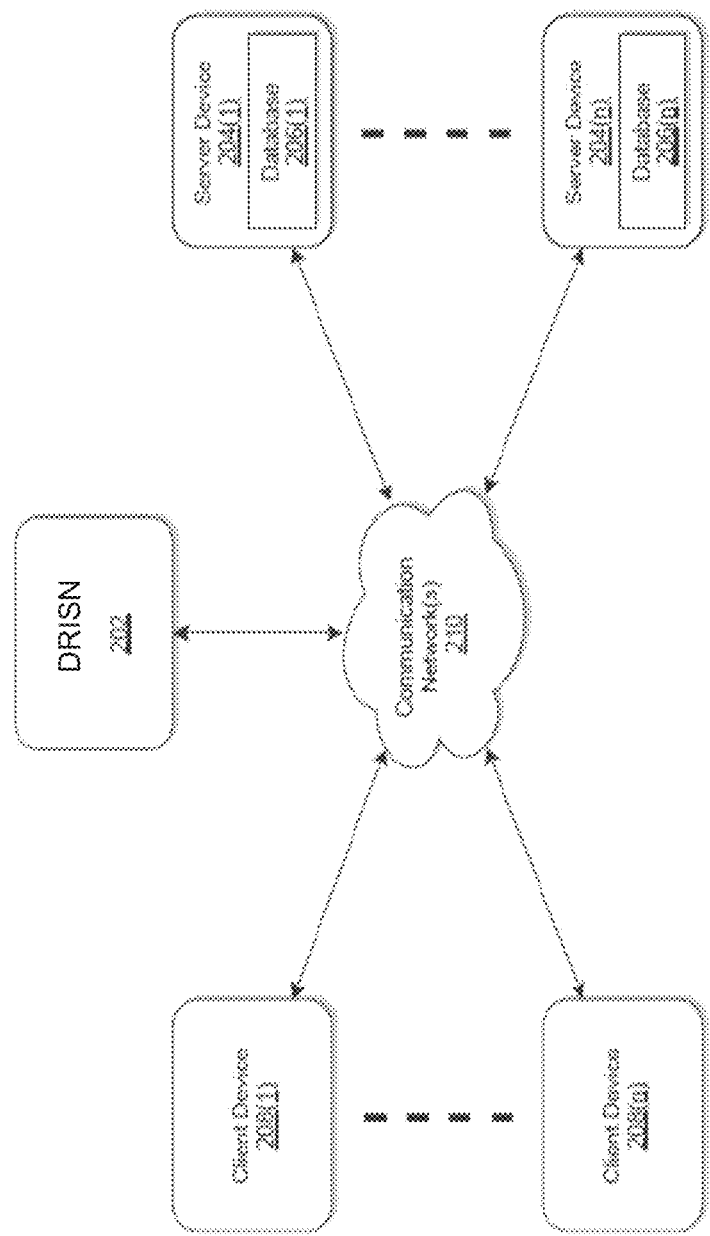
FIG. 2 illustrates an exemplary diagram of a network environment with a cloud native dependency registration and impacted service notification system in accordance with an exemplary embodiment.

FIG. 2 illustrates an exemplary diagram of a network environment with a cloud native dependency registration and impacted service notification system in accordance with an exemplary embodiment.

According to exemplary embodiments, the above-described problems associated with conventional approach may be overcome by implementing a dependency registration and impacted service notification (DRISN) system 202 as illustrated in FIG. 2 that may provide a platform for implementing a cloud native DRISN module(s) or component(s) that serve as a cloud based monitoring hub across multiple heterogeneous platforms/environments existing in an organization's eco-system. The DRISN system 202 provides consolidated or standard process automation tools as a service for any potential end-user without the need to learn any other advanced programming languages or concepts. Further, since the DRISN system 202 standardizes may processes while allowing configuration of rules and parameters, custom automation tools are often unnecessary, which reduces memory requirements for storing of large number of customized user tools.

The DRISN system 202 may be the same or similar to the computer system 102 as described with respect to FIG. 1.

The DRISN system 202 may store one or more applications that can include executable instructions that, when executed by the DRISN system 202, cause the DRISN system 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DRISN system 202 itself, may be located in virtual server(s) running in a cloud-based computing environment rather than being tied to one or more specific physical network computing devices. Also, the application(s) may be running in one or more virtual machines (VMs) executing on the DRISN system 202. Additionally, in one or more embodiments of this technology, virtual machine(s) running on the DRISN system 202 may be managed or supervised by a hypervisor.

In the network environment 200 of FIG. 2, the DRISN system 202 is coupled to a plurality of server devices 204(1)-204(n) that hosts a plurality of databases 206(1)-206(n), and also to a plurality of client devices 208(1)-208(n) via communication network(s) 210. A communication interface of the DRISN system 202, such as the network interface 114 of the computer system 102 of FIG. 1, operatively couples and communicates between the DRISN system 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DRISN system 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DRISN system 202 may be a standalone device or integrated with one or more other devices or apparatuses, such as one or more of the server devices 204(1)-204(n), for example. In one particular example, the DRISN system 202 may be hosted by one of the server devices 204(1)-204(n), and other arrangements are also possible. Moreover, one or more of the devices of the DRISN system 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DRISN system 202 via the communication network(s) 210 according to the HTTP-based protocol and/or JavaScript Object Notation (JSON) protocol, for example, although other protocols may also be used. According to a further aspect of the present disclosure, wherein the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the DRISN system 202 that may efficiently provide a platform for implementing a cloud native DRISN module that serves as a cloud based alternative to standard process automation tools or user tools as a service for any potential end-user without the need to learn any other advanced programming languages or concepts, but the disclosure is not limited thereto.

The client devices 208(1)-208(n) may run interface applications, such as standard web browsers or standalone client applications, which may provide an interface to communicate with the DRISN system 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the DRISN system 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DRISN system 202, the server devices 204(1)-204(n), or the client devices 208(1)-208(n), for example, may be configured to operate as virtual instances on the same physical machine. For example, one or more of the DRISN system 202, the server devices 204(1)-204(n), or the client devices 208(1)-208(n) may operate on the same physical device rather than as separate devices communicating through communication network(s) 210. Additionally, there may be more or fewer DRISN systems 202, server devices 204(1)-204(n), or client devices 208(1)-208(n) than illustrated in FIG. 2. According to exemplary embodiments, the DRISN system 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
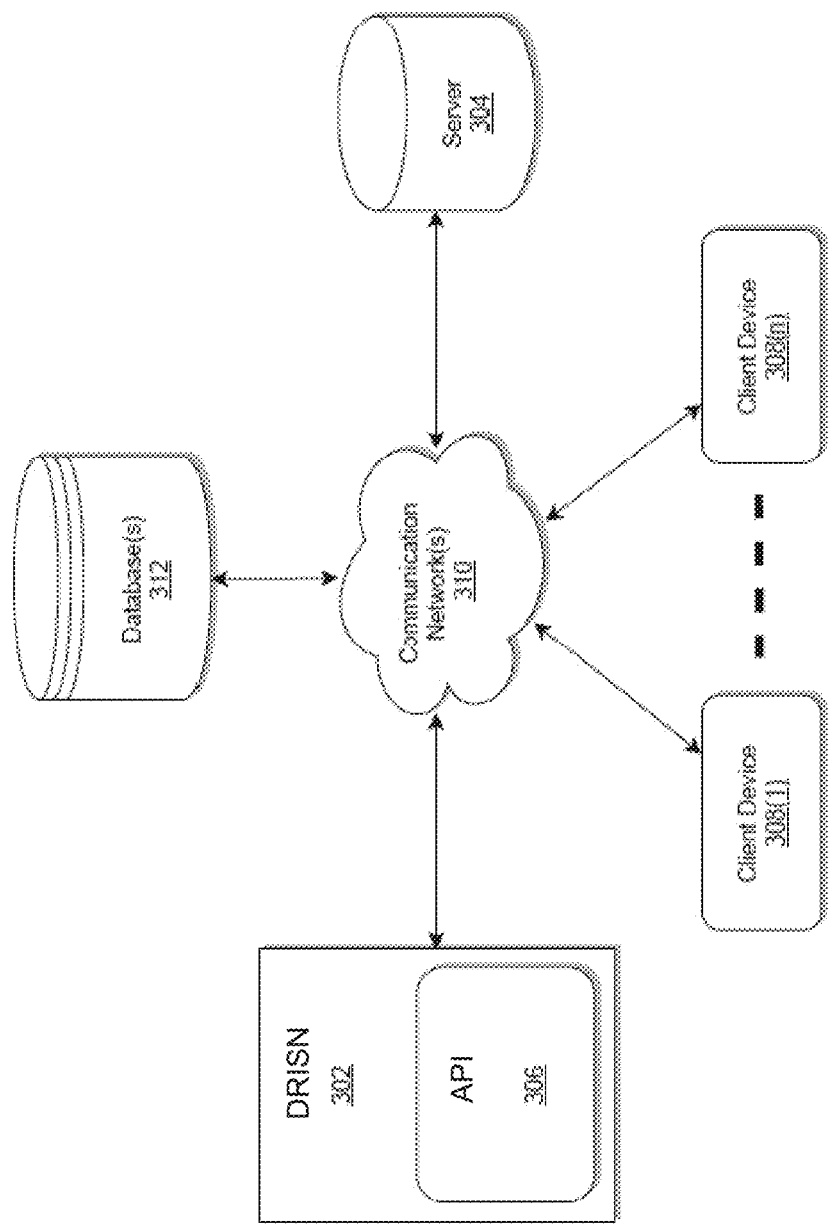
FIG. 3 illustrates a system diagram for implementing a cloud native dependency registration and impacted service notification system in accordance with an exemplary embodiment.

FIG. 3 illustrates a system diagram for implementing a cloud native dependency registration and impacted service notification system in accordance with an exemplary embodiment.

As illustrated in FIG. 3, the system 300 may include a DRISN system 302 within which a group of API modules 306 is embedded, a server 304, a database(s) 312, a plurality of client devices 308(1) . . . 308(n), and a communication network 310.

According to exemplary embodiments, the DRISN 302 including the API modules 306 may be connected to the server 304, and the database(s) 312 via the communication network 310. Although there is only one database has been illustrated, the disclosure is not limited thereto. Any number of databases may be utilized. The DRISN System 302 may also be connected to the plurality of client devices 308(1) . . . 308(n) via the communication network 310, but the disclosure is not limited thereto.

According to exemplary embodiment, the DRISN system 302 is described and shown in FIG. 3 as including the API modules 306, although it may include other rules, policies, modules, databases, or applications, for example. According to exemplary embodiments, the database(s) 312 may be embedded within the DRISN system 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data from the plurality of client devices 308(1) . . . 308(n) via the communication network 310.

According to exemplary embodiments, as will be described below, the API modules 306 may include, without limitation, request management API, automation template API, and execution API. The API modules 306 may provide a master catalog providing access to different APIs. In an example, upon authentication of a user, the API modules 306 may provide various automation request templates corresponding to an access setting of the user as specified in user profile.

The request management API may allow the user to create new automation requests, schedule the automation requests, association requests with existing automation templates, association requests with executions, search for automation requests, check status of an automation request, and trigger creation, submission, and completion notification.

The automation template API may fetch automation template inputs form attributes, retrieve automation template variables, retrieve automation template rules/formats attributes, CRUD (create, read, update and delete) for reference data, and the like.

The execution API may, without limitation, trigger data ingestion process, trigger automation processing (e.g., validation, transformation, calculation, and arrangement), trigger storage and/or transfer of resulting data and documents, and read/write logs.

The API modules 306 may be configured to implement a user interface (UI) platform that is configured to enable DRISN as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the DRISN system 302. In this regard, the plurality of client devices 308(1) . . . 308(n) may be "clients" of the DRISN system 302 and are described herein as such. Nevertheless, it is to be known and understood that the plurality of client devices 308(1) . . . 308(n) need not necessarily be "clients" of the DRISN system 302, or any entity described in association therewith herein. Any additional or alternative relationship may exist between either or both of the plurality of client devices 308(1) . . . 308(n) and the DRISN system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) ... 308(n) may communicate with the DRISN system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The DRISN system 302 may be the same or similar to the DRISN system 202 as described with respect to FIG. 2, including any features or combination of features described with respect thereto.

Figure 4:
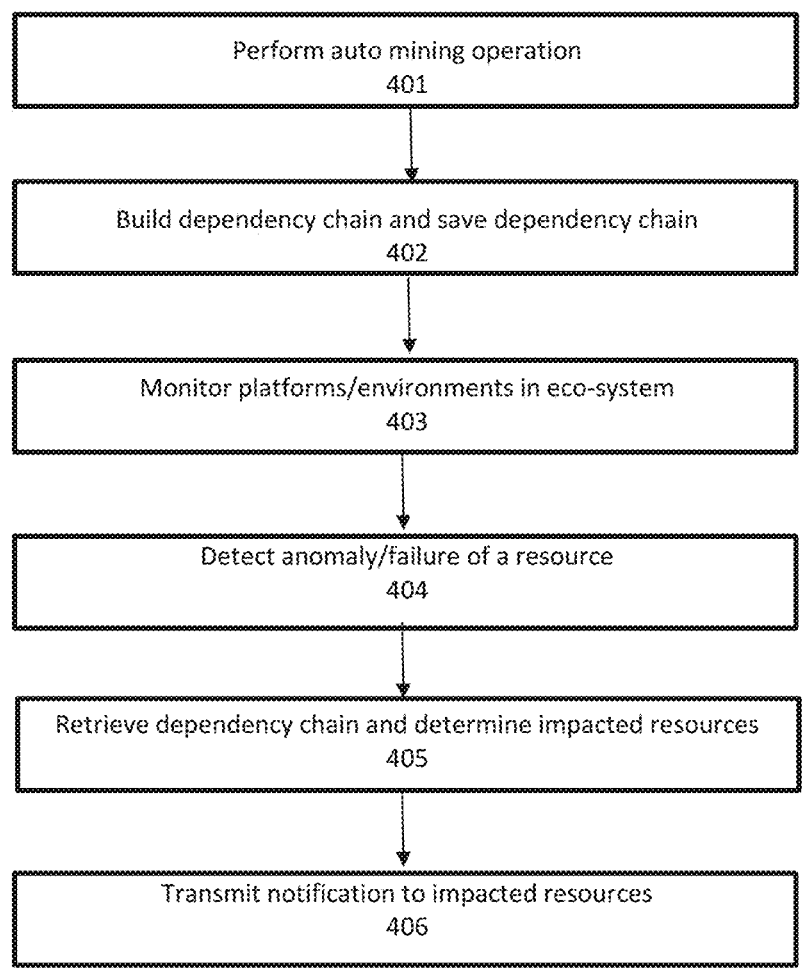
FIG. 4 illustrates a method for performing generation of a dependency chain, identification of impacted services, and transmission of a notification to the impacted services in accordance with an exemplary embodiment.

FIG. 4 illustrates a method for performing generation of a dependency chain, identification of impacted services, and transmission of a notification to the impacted services in accordance with an exemplary embodiment.

In operation 401, performing an automated mining operation for each platform/environment of multiple platforms/environments included in an organization's eco-system for obtaining of resource data of various resources included in the eco-system. The resource data may include identification information of resources, resource type information, and relationships/dependencies with respect to other resources.

According to non-limiting aspects of the present application, the auto mining operation may be performed by performing a scan across each platform/environment included in the organization's ecosystem. When performing the scan, various resources included in the respective platform/environment may be identified. Along with the identification of the resources, resource type may also be identified. Resource types may include, without limitation a hardware, application, services and the like. In addition, dependencies or relationships with other resources in a same or a different platform/environment may also be identified.

In an example, relationships or dependencies between the identified resources may be determined based on load balancing, based on communications with other resources, interconnectivity, or the like. For example, in a cloud architecture, an internal cloud may be locked down to restrict access. In such cloud architecture, specific ports may be required to be opened before any resource may connect to it. At least since firewall has to be opened up to provide such connection, information of the connecting resource may be obtained. Further, resource information may also be gathered based on user operations.

The relationships or dependencies between the identified resources may be determined automatically during a scanning process. However, aspects of the present disclosure are not limited thereto, such that the relationships or dependencies may be further edited or modified after the auto mining operation is completed.

Further, the relationships/dependencies may indicate the related/dependent resource as well as the environment/platform in which the related/dependent resource may reside. Further, the relationships/dependencies may indicate the nature of the relationship or dependency. For example, the relationship/dependency may indicate whether one application is a downstream or upstream application in relation to another application. If a related resource is determined to be a downstream resource of a mined resource, the related resource may be affected by a failure of the mined resource. In contrast, if the related resource is determined to be an upstream resource of the mined resource, the failure of the mined resource may not significantly impact performance of the upstream resource.

However, aspects of the present application is not limited thereto, such that the dependency chain may be structured as a web, where it indicates whether an application is related to another application or not.

In operation 402, a dependency chain is generated or built based on the information gathered during the auto mining process in operation 401, and stored in a database. The gathered information may indicate identification of the resource, type of resource, and dependencies/relationships with other resources. For example, the dependencies of a target resource may indicate resource(s) that the target resource may transmit information to (e.g., downstream resource) and/or resource(s) that the target resource may receive information from (e.g., upstream resource). Further, the dependencies or relationship information may instead indicate that various resources with which the target resource communicates.

Further, the dependencies/relationships with other resources may cut across different platforms/environments in the eco-system of the organization. In an example, one resource of a first platform/environment may have related/dependent resources at a second and/or third platforms/environments.

In an example, the dependency chain may also be generated in a graphical format or in a chart form for easier visibility to a user. Based on the dependency chain, a user may have a better overview of various relationships between various resources and/or platforms/environments. Also, the dependency chain may also indicate amount of communication between certain resources and/or platforms/environments for identifications of potential bottlenecks in network traffic. Further, in an example, the dependency chain may be modified based on environment settings or network configurations.

In operation 403, each of the platforms/environments in the eco-system of is monitored by one or more monitoring tools. Monitoring tools may include, for example, App Mon, GTI Bus or the like. The monitoring tools may monitor performance and availability of a particular resource to detect a resource change event. In an example, performance may be monitored with respect to predetermined threshold values to ensure that the particular resource is performing within expected level of service. When a performance metric of a resource drops below a predetermined or reference threshold value, a resource change event may be detected.

In operation 404, an anomaly or failure is detected in one or more resources in the eco-system as a resource change event. The anomaly or failure may be a non-functioning status of a resource, a diminished performance thereof, or an inability to connect to the resource. Given the level of performance, it may be indicated as a fix that is to be addressed immediately, after hours, or during a scheduled maintenance. In an example, the level of performance may be based on a number of impacted resources or an importance of the respective resource.

In operation 405, once the anomaly or failure is detected at a particular resource, the dependency chain is retrieved for determination of impacted resources. In an example, the impacted resources may include downstream resources, which depend on information from the particular resource for which the anomaly or failure is detected, but not upstream resources, which may provide information to the particular resource but does not depend on information from the particular resource. Alternatively, the impacted resources may include any resource that may communicates with the particular resource.

In operation 406, a notification is transmitted to the impacted resources. In an example, notification may be transmitted as an email, text message, voice mail, other notification medium or a combination of the thereof.

Although the present disclosure was described with respect to providing notification to impacted resources upon detecting of an anomaly or failure of a resource within a dependency chain, aspects of the present application are not limited thereto. For example, the dependency chain may be utilized to notify dependent resources of a resource that may be scheduled to have maintenance or upgrade performed thereon.

Figure 5:
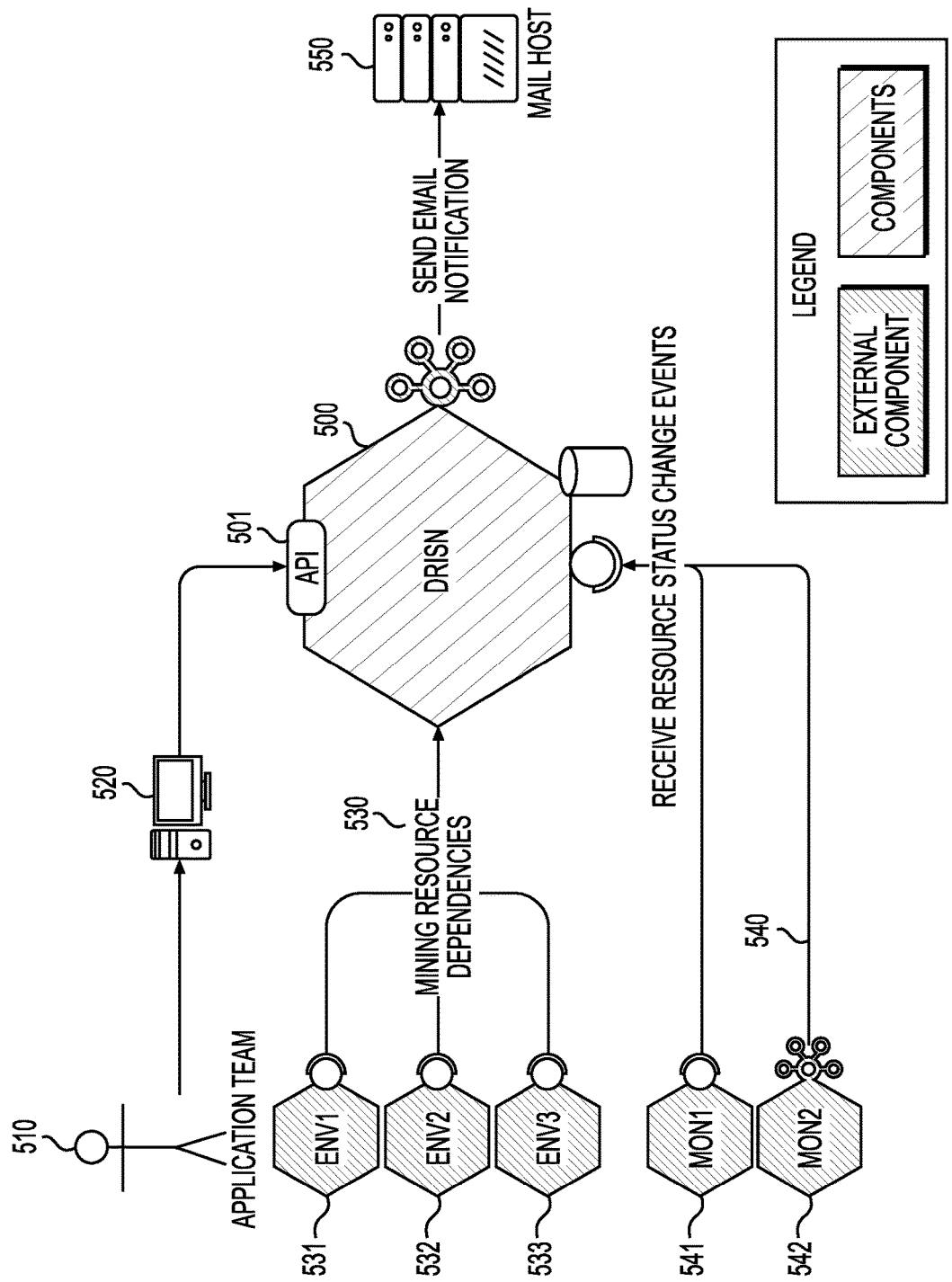
FIG. 5 illustrates an eco-system of an organization including a dependency registration and impacted service notification system in accordance with an exemplary embodiment.

FIG. 5 illustrates an eco-system of an organization including a dependency registration and impacted service notification system in accordance with an exemplary embodiment.

According to aspects of the present application exemplarily illustrated in FIG. 5 provides that an eco-system of an organization includes a DRISN system 500, an application team 510, a client terminal 520, a plurality of environments or platforms 530, a plurality of monitoring tools 540, and a mail host 550. In an example, the DRISN system 500 may scan each of the plurality of environments or platforms 530 to identify resources included in each of the environments or platforms 531, 532 and 533, and determine resource for each of the identified resources. The identified resources and corresponding dependency may be utilized to build a dependency chain. In an example, a single aggregate dependency chain may be formed for each of the plurality of environments 530, or multiple dependency chains may be generated, one for each of the plurality of environments 530.

Although a dependency chain including all of the identified resources is described above, aspects of the present application are not limited thereto, such that less than all of the identified resources may be included in the dependency chain, such that only the resources having other resource dependencies may be included in the dependency chain. In another example, only resources having dependencies residing in a different environment may be included in the dependency chain, such that resource dependency residing in the same environment may not be included in the dependency chain.

Further, although only three environments 531, 532 and 533 are illustrated, aspects of the present disclosure are not limited thereto, such that more or less than the number of environments may exist in an eco-system.

In an example, the application team 510 may access the DRISN system 500 by utilizing the client computer 520 to access the cloud network in which DRISN system 500 resides by accessing its API 501. Once accessed, the application team 510 may have access the dependency chain, which may be presented in data format or in a graphical format for easier readability.

Once the dependency chain(s) are generated, application monitoring tools 540 performs monitoring of the network to determine anomaly or failure occurring in any of the resources included in the dependency chain(s). In an example, the monitoring tools 540 includes a first monitoring tool 541 and a second monitoring tool 542. Although only two monitoring tools are illustrated in FIG. 5, aspects of the present disclosure are not limited thereto, such that more or less monitoring tools may be utilized.

Once the anomaly or failure is detected by the application monitoring tools 540, resource dependencies of the resource for which anomaly or failure are identified. Based on the resource dependencies, notifications will be transmitted to impacted users via the mail host 550. Although the mail host 550 is illustrated as the mechanism via which the notifications are to be delivered, aspects of the present disclosure are not limited thereto, such that other notification systems (e.g., text message, web based message, voice call, or the like) may be utilized. In an example, the impacted users may include users of dependent resources, and parties responsible for supporting or overseeing the dependent resources.

Figure 6:
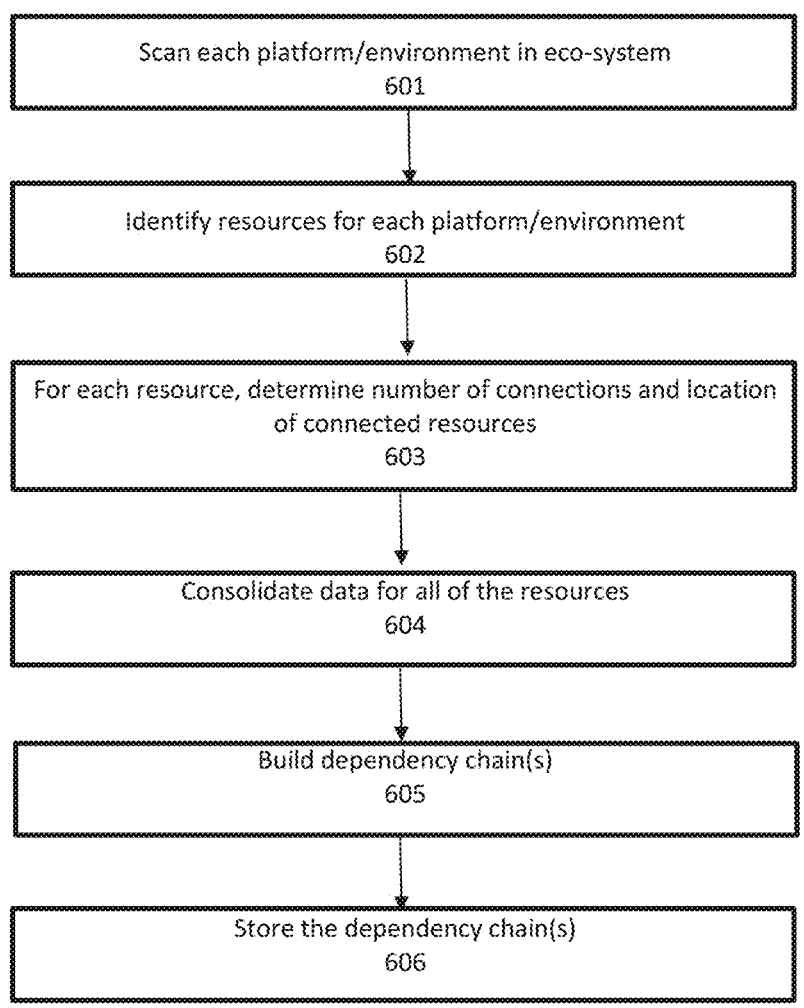
FIG. 6 illustrates a method for generating of a dependency chain in accordance with an exemplary embodiment.

FIG. 6 illustrates a method for generating of a dependency chain in accordance with an exemplary embodiment.

In operation 601, a DRISN system performs scanning of each of multiple platforms and environments included in an eco-system.

In operation 602, resources included in the platforms and environments are identified. In an example, each resource in the eco-system may be identified and stored. In another example, only resources connected to other resources may be identified for inclusion in a dependency chain.

In operation 603, for the identified resources, a determination of number of connections with other resources is made. Further, a determination of locations of the connected resources may also be made. Based on the number of connections and/or their respective locations, a determination of importance or a magnitude of impact may be made. For example, if resource A in platform/environment 1 is connected with resources B and C in platforms/environments 2 and 3, it may be determined that the failure of resource A may impact three environments and is more important over a resource that may impact only two platforms/environments. Further, a priority for addressing each of the one or more resources that are impacted by a change event may be set based on the number of connections with other resources for each of the one or more resources that are impacted by the change event.

In an example, urgency or level of attention required may be distinguished for resources that are determined to be more important than others. According to exemplary aspects, a failure of a more important resource may trigger immediate action(s) by a technical support team, whereas failures of less egregious nature may be relegated to after hour response to minimize impact to users of the eco-system.

In operation 604, all of the collected data in operations 602 and 603 for each of the platforms/environments are consolidated.

In operation 605, one or more dependency chains are generated. In an example, a single dependency chain may be formed for all of the platforms or environments. In another example, multiple dependency chains may be formed. More specifically, each dependency chain may be formed for one or more of the platforms or environments. However, aspects of the present disclosure are not limited thereto, such that individual dependency chains may be generated for each of the platforms or environments, along with a master dependency chain for all of the platforms or environments. Further still, the generated dependency chains may be modified after generation to manually edit the dependencies.

In operation 606, the generated one or more dependency chains may be stored. In an example, the one or more dependency chains may be stored on a cloud network. However, aspects of the present disclosure is not limited thereto, such that such information may be stored at a remote server.

Figure 7:
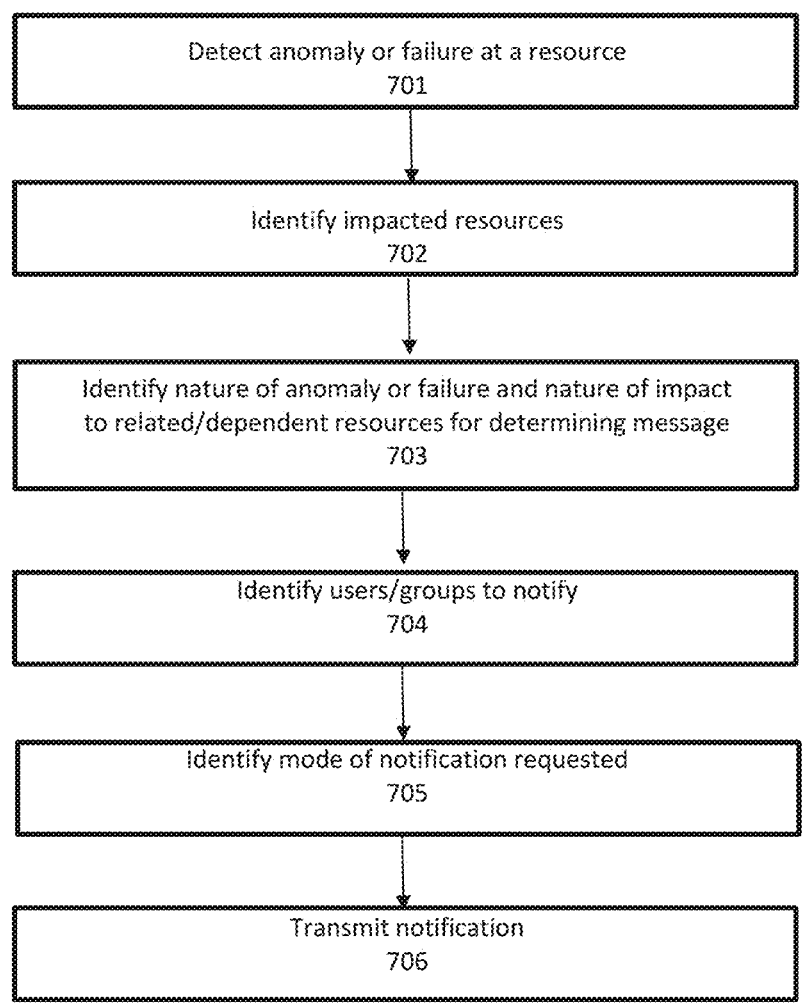
FIG. 7 illustrates a method for providing a select notification to impact services in accordance with an exemplary embodiment.

FIG. 7 illustrates a method for providing select notification to impact services in accordance with an exemplary embodiment.

In operation 701, an anomaly or failure is detected as a change event at a resource included in a dependency chain for an eco-system of an organization. In an example, such resource may be identified as an anomalous resource.

In operation 702, impacted resources for the anomalous resource, for which anomaly or failure is detected, are identified. The impacted resources may include resources that may communicate with the anomalous resource for which the anomaly or failure is detected. The impacted resources may include only resources that depend on the anomalous resource, and not upstream resources that provide information for the anomalous resource. Alternatively, the impacted resources may include any resource that is configured to communicate with the anomalous resource.

In operation 703, a nature of the anomaly or failure (i.e., change event) is identified. However, aspects of the disclosure is not limited thereto, such that additional attributes of the change event may be identified. In an example, the change event may indicate at least one of a nature of anomaly, a severity of the anomaly, a nature of impact and a severity of the impact. The nature of the detected anomaly or failure may be a slower service, severity of slow service (e.g., speed, length and etc.), incorrect operation, a disconnected status, or the like.

Also, nature of impact to related/dependent resources is also identified. For example, the nature of impact to related/dependent resources may indicate slower than normal service, severity of slow service (e.g., speed, length and etc.), incorrect operation, inability to connect or the like.

Based on such information, content of the notification message is determined. For example, the notification may specify at least one of an identification of the target resource, a nature of the change event detected at the target resource, an identification of the one or more resources impacted by the change event, a degree of impact to the one or more resources impacted by the change event, an immediacy of resolution, an expected response action and an estimated schedule of the expected response action.

In operation 704, users and/or groups for notification is identified. The users and/or groups for notification may include users of impacted resources, and one or more groups that may be responsible for overseeing or supporting the impacted resources. For example, users of the impacted resource may include users of the related/dependent resources and users of the resource for which anomaly and failure is detected. Further, aspects of the present disclosure are not limited thereto, such that other users may request notification for any particular resource or resources.

In operation 705, a mode of notification requested by the identified users and/or groups are identified. In an example, the identified users may have a preferred mode of receiving notification. For example, a normal application user may request to be notified by email, whereas a technical support personnel may request to be notified by email, text message, voice message, or other wireless communication to provide an immediate response. Further, each of the users may modify the notification setting in a user's profile according to the respective users' needs.

Figure 8:
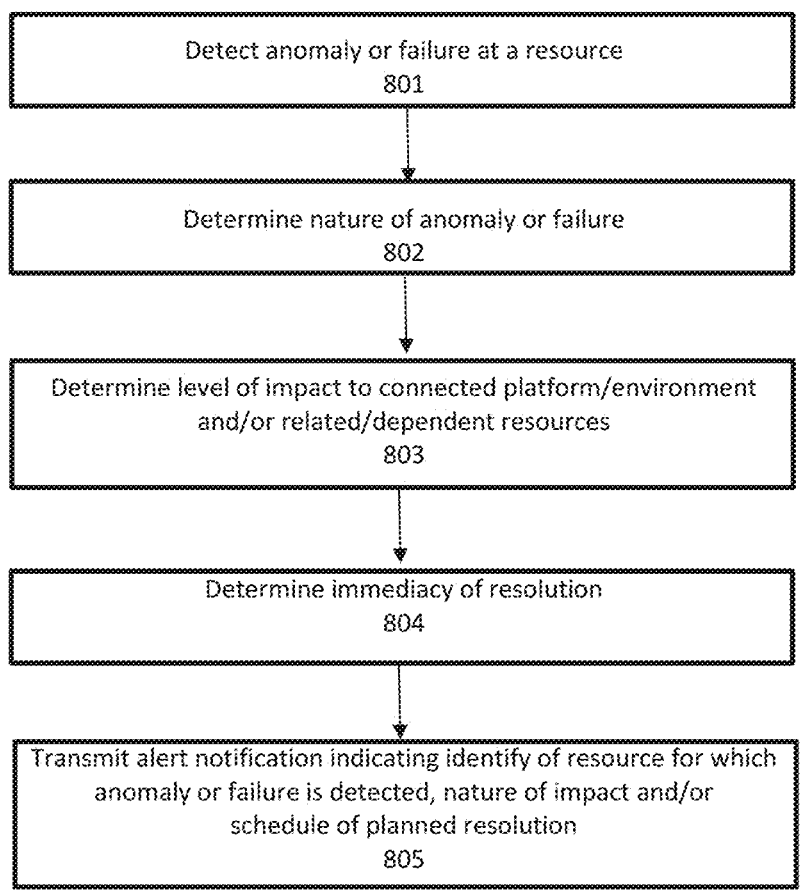
FIG. 8 illustrates a method for providing of targeted resolution in accordance with an exemplary embodiment.

FIG. 8 illustrates a method for providing of targeted resolution in accordance with an exemplary embodiment.

In operation 801, an anomaly or failure is detected at a resource included in a dependency chain for an eco-system of an organization.

In operation 802, a nature of the anomaly or failure is identified. For example, the nature of the detected anomaly or failure may be a slower service, severity of slow service (e.g., speed, length and etc.), incorrect operation, a disconnected status, or the like.

In operation 803, a level of impact to connected platform/environment and/or connected/related resources is determined. The level of impact may indicate anywhere from inefficient processing to inaccessibility. If the level of impact rises to inaccessibility of the impacted resource, and such impact to the respective resource may be limited to the impacted resource or may cause an entire platform or environment to be non-functional.

Based on the determined level of impact to the connected/related resource, and/or its corresponding platform/environment, immediacy of resolution is determined in operation 804. If the impacted resource is determined to be an isolated resource that has little usage, resolution may be set to be performed after hours to avoid unnecessary downtime. On the other hand, if the impacted resource(s) are determined to be heavily utilized resources, or if the impacted resource(s) cause serious performance issues for a corresponding platform/environment, a request for immediate fix may be deployed.

Based on the determination of operation 804, alert notification is sent to relevant parties (e.g., application users, technical support personnel, stake holders, and etc.) The alert notification may indicate an identity of the resource for which anomaly or failure is detected, a nature of impact, and/or a schedule of the planned resolution (e.g., immediate fix, after hour fix, weekend fix or the like).

As noted above, the present application discloses performing auto-mining of resources for each resource on boarded in an organization's eco-system for identifying of resources along with dependencies it connects to. The dependencies may cut across various platforms. The identified dependencies or relationships may be utilized to build one or more dependency chains, which are then stored for later retrieval.

Once one or more dependency chains are identified, a team member accessing an application in one of the dependency chain is notified when a failure occurs in another application in the dependency chain. More specifically, failures from various monitoring tools may be utilized to determine impacted services by using the dependency chain and communicate the failures to all impacted service teams immediately. Monitoring tools may include an event bus, App mon and the like.

Based on use of the dependency chains, a failure at an application, a resource or a node in the dependency chain may trigger notification to all impacted services. Further, upgrades or maintenances may be accurately and timely communicated to impacted services and/or applications. Further, scale of impact may be determined and across the organization and across all platforms/environments at the organization. Failure and root cause may be shared across dependency chains.

Further, although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing dependency registration and impacted service notification (DRISN), the method comprising:
    mining, via a cloud network and by a processor, resource data for a plurality of resources included in each platform among a plurality of heterogeneous platforms included in a single eco-system;
    identifying, for each resource among the plurality of resources mined and by the processor, one or more connections with other resources present in the plurality of heterogeneous platforms based on the mined resource data;
    generating, by the processor, a resource dependency chain from the resource data and the identified one or more connections, wherein the resource dependency chain indicates a direction of dataflow;
    storing, in a memory, the resource dependency chain;
    monitoring change events for the plurality of resources included in the plurality of heterogeneous platforms; and
    when a change event is detected for a target resource among the plurality of resources,
        retrieving the resource dependency chain from the memory,
        determining, among resources included in the resource dependency chain, downstream resources that depend from the target resource and are impacted by the change event detected for the target resource based on the resource dependency chain,
        determining a timing for responding to the change event based on a number of the downstream resources that are impacted by the change event detected for the target resource, wherein the timing is specified to be at a first time point when the number of downstream resources impacted is greater than a threshold value, and the timing is specified to be at a second time point when the number of downstream resources impacted is less than the threshold value, the second time point being later in time than the first time point, identifying, by the processor, a mode of notification specified for each of users of the downstream resources, wherein at least two different modes of notification are specified by the users of the downstream resources, and transmitting, by a communication circuit and according to the mode of notification identified for each of the users of downstream resources, a notification to the users of the downstream resources that depend from the target resource and are impacted by the change event detected for the target resource.

2. The method according to claim 1, wherein the change event includes performance below a predetermined threshold.

3. The method according to claim 1, wherein the change event includes an inability to connect to the target resource.

4. The method according to claim 1, wherein the change event indicates at least one of a nature of anomaly, a severity of the anomaly, a nature of impact and a severity of the impact.

5. The method according to claim 1, wherein the users include at least application users of the downstream resources impacted by the change event, support personnel of the downstream resources, support personnel of one or more platforms including the downstream resources, and one or more users requesting notification for the downstream resources impacted by the change event.

6. The method according to claim 1, wherein the notification is provided by at least one of email, voice mail, text message, and a requested form of communication.

7. The method according to claim 1, wherein the notification indicates at least one of an identification of the target resource, a nature of the change event detected at the target resource, an identification of the downstream resources impacted by the change event, a degree of impact to the downstream resources impacted by the change event, an immediacy of resolution, an expected response action and an estimated schedule of the expected response action.

8. The method according to claim 1, further comprising:
determining a number of connections for the target resource; and
determining a degree of severity of impact based on the determined number of connections.

9. The method according to claim 1, further comprising:
determining whether the downstream resources impacted by the change event reside on a same or different platform from the target resource; and
determining a degree of severity of impact to be higher when the downstream resources impacted by the change event reside on the different platform from the target resource.

10. The method according to claim 1, wherein the resource data includes at least one of an identification of a corresponding resource, a platform identification, and a number of connections with other resources.

11. The method according to claim 1, wherein the downstream resources that are impacted by the change event reside on a platform different from a platform on which the target resource resides.

12. The method according to claim 1, wherein the resource dependency chain includes only resources having connections with the one or more connections with other resources present in the plurality of heterogeneous platforms.

13. The method according to claim 1, wherein the resource dependency chain includes every resource present in the plurality of heterogeneous platforms.

14. The method according to claim 1, wherein the resource dependency chain is generated for each of the plurality of heterogeneous platforms for a plurality of resource dependency chains.

15. The method according to claim 1, wherein the resource dependency chain is generated as a single aggregate resource dependency chain for the plurality of heterogeneous platforms.

16. The method according to claim 1, wherein the one or more connections with other resources present in the plurality of heterogeneous platforms is determined based on load balancing set for a respective resource.

17. The method according to claim 1, wherein the notification is transmitted to, among the resources included in the resource dependency chain, only users of the downstream resources from the target resource and not to users of upstream resources from the target resource.

18. The method according to claim 1, further comprising:
setting a priority for addressing each of the downstream resources that are impacted by the change event based on a number of connections with other resources set for each of the downstream resources that are impacted by the change event.

19. A dependency registration and impacted service notification (DRISN) system, comprising:
a processor;
a memory; and
a communication circuit,
wherein the processor is configured to:
mine, via a cloud network, resource data for a plurality of resources included in each platform among a plurality of heterogeneous platforms included in one eco-system;
identify, for each resource among the plurality of resources mined, one or more connections with other resources present in the plurality of heterogeneous platforms based on the mined resource data;
generate a resource dependency chain from the resource data and the identified one or more connections, wherein the resource dependency chain indicates a direction of dataflow;
store, in the memory, the resource dependency chain;
monitor, via a monitoring tool, change events for the plurality of resources included in the plurality of heterogeneous platforms; and
when a change event is detected for a target resource among the plurality of resources,
retrieve the resource dependency chain from the memory,
determine, among resources included in the resource dependency chain, downstream resources that depend from the target resource and are impacted by the change event detected for the target resource based on the resource dependency chain, determine a timing for responding to the change event based on a number of the downstream resources that are impacted by the change event detected for the target resource, wherein the timing is specified to be at a first time point when the number of downstream resources impacted is greater than a threshold value, and the timing is specified to be at a second time point when the number of downstream resources impacted is less than the threshold value, the second time point being later in time than the first time point, identify a mode of notification specified for each of users of the downstream resources, wherein at least two different modes of notification are specified by the users of the downstream resources, and transmit, via the communication circuit and according to the mode of notification identified for each of the users of downstream resources, a notification to the users of the downstream resources that depend from the target resource and are impacted by the change event detected for the target resource.

20. A non-transitory computer readable storage medium that stores a computer program for performing a projected graph based prediction, the computer program, when executed by a processor, causing a system to perform a process comprising:

mining, via a cloud network, resource data for a plurality of resources included in each platform among a plurality of heterogeneous platforms included in one ecosystem;

identifying, for each resource among the plurality of resources mined, one or more connections with other resources present in the plurality of heterogeneous platforms based on the mined resource data;

generating a resource dependency chain from the resource data and the identified one or more connections, wherein the resource dependency chain indicates a direction of dataflow;

storing, in a memory, the resource dependency chain;

monitoring, via a monitoring tool, change events for the plurality of resources included in the plurality of heterogeneous platforms; and when a change event is detected for a target resource among the plurality of resources, retrieving the resource dependency chain from the memory, determining, among resources included in the resource dependency chain, downstream resources depend from the target resource and that are impacted by the change event detected for the target resource based on the resource dependency chain, determining a timing for responding to the change event based on a number of the downstream resources that are impacted by the change event detected for the target resource, wherein the timing is specified to be at a first time point when the number of downstream resources impacted is greater than a threshold value, and the timing is specified to be at a second time point when the number of downstream resources impacted is less than the threshold value, the second time point being later in time than the first time point, identifying a mode of notification specified for each of users of the downstream resources, wherein at least two different modes of notification are specified by the users of the downstream resources, and transmitting, by a communication circuit and according to the mode of notification identified for each of the users of downstream resources, a notification to the users of the downstream resources that depend from the target resource and are impacted by the change event detected for the target resource.

* * * * *